April 2, 1940.  C. J. KLEIN ET AL  2,195,535
APPARATUS FOR SHEARING
Filed Nov. 26, 1937  5 Sheets-Sheet 5
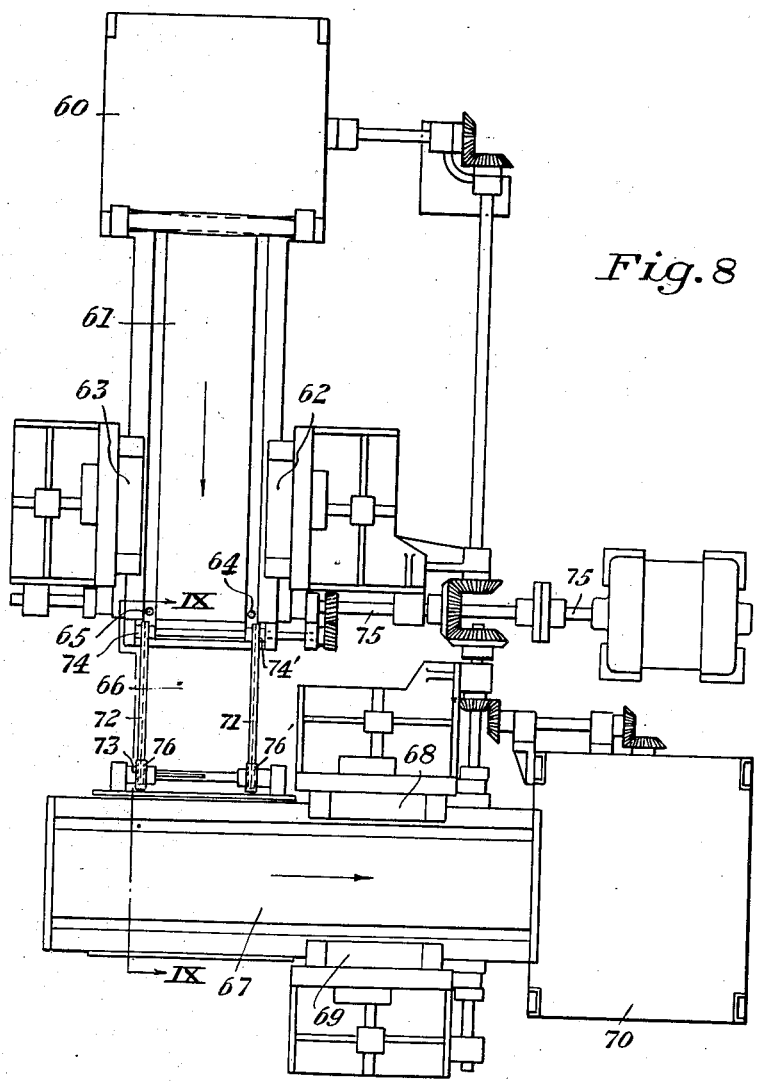
Fig. 8
Fig. 9
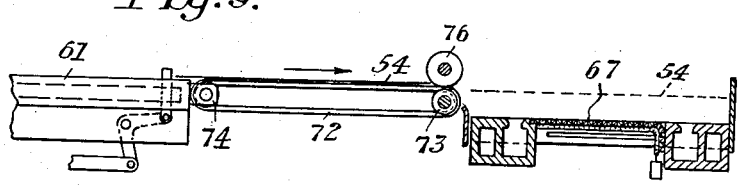
INVENTOR
Clarence J. Klein
and Ernest W. Rieger
BY
Stebbins, Blenko & Parmelee
ATTORNEYS Patented Apr. 2, 1940

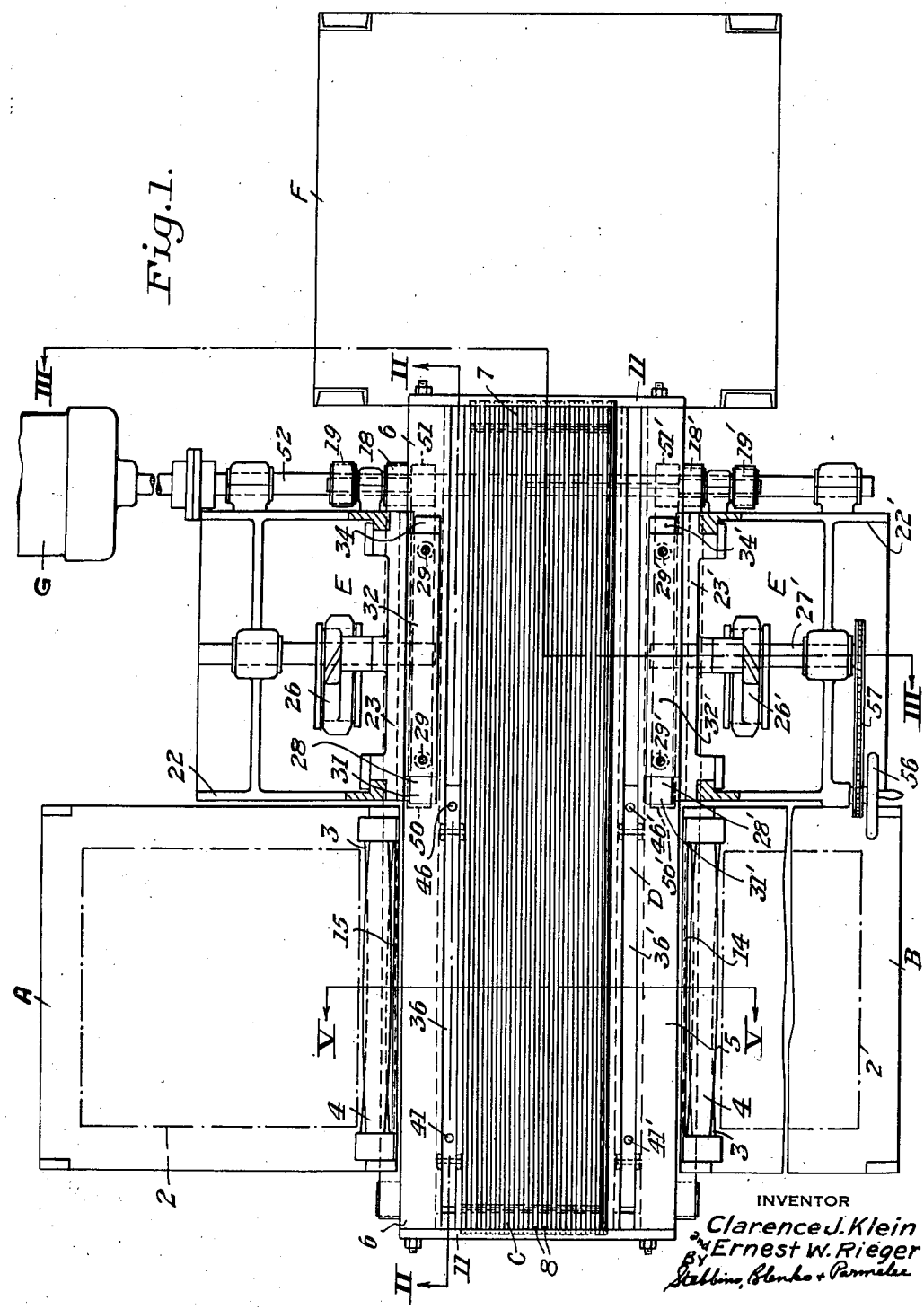

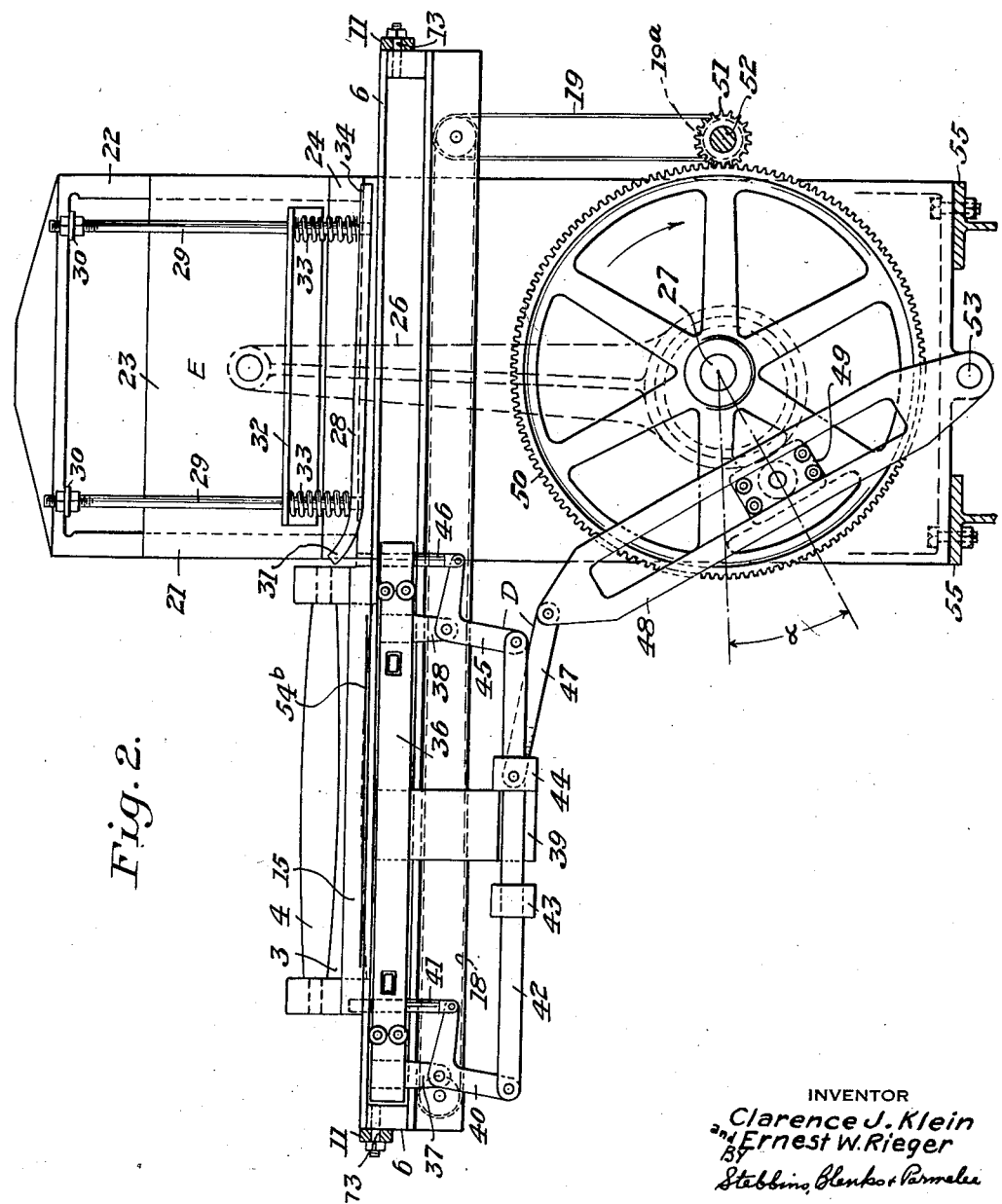

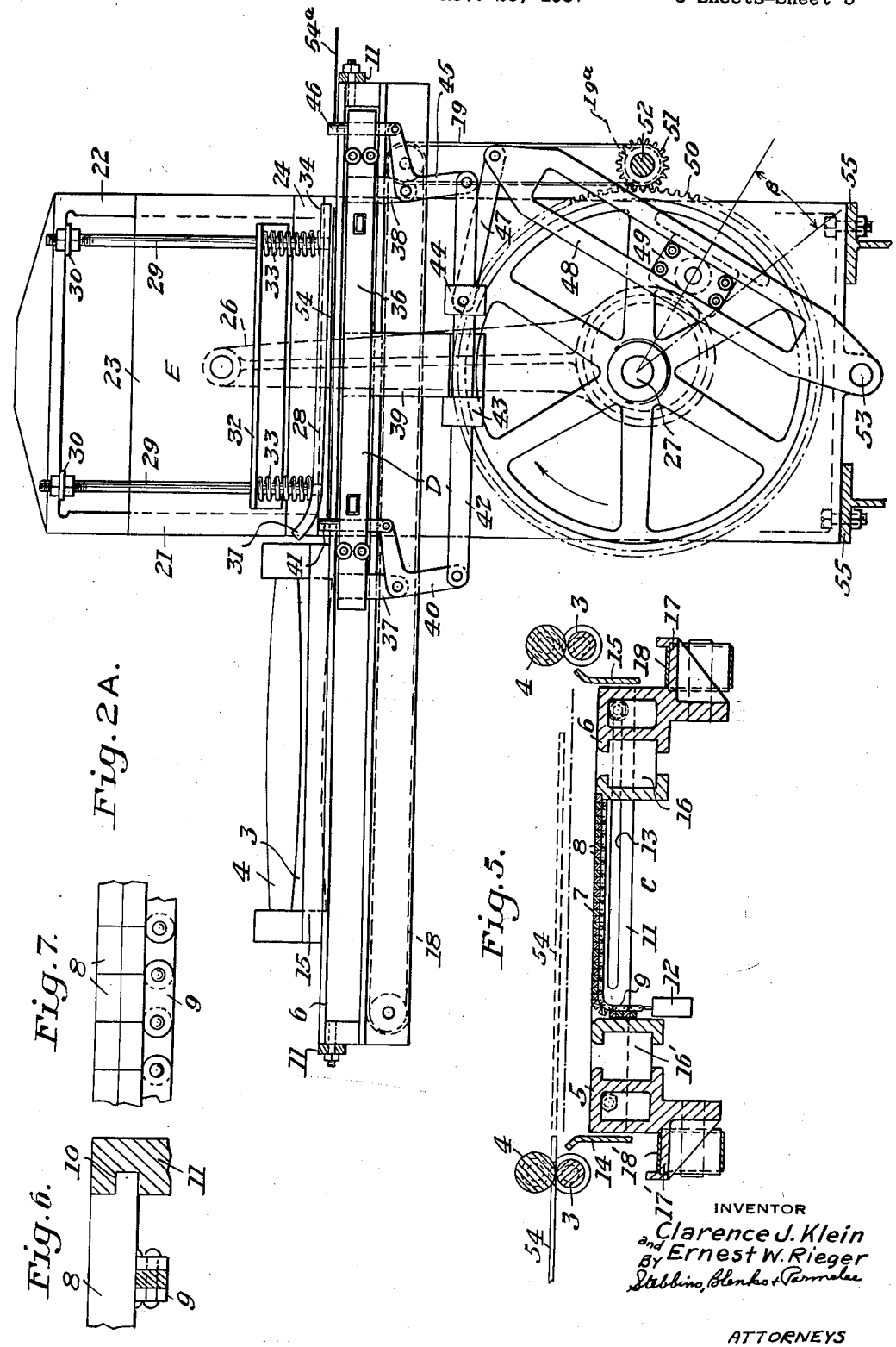

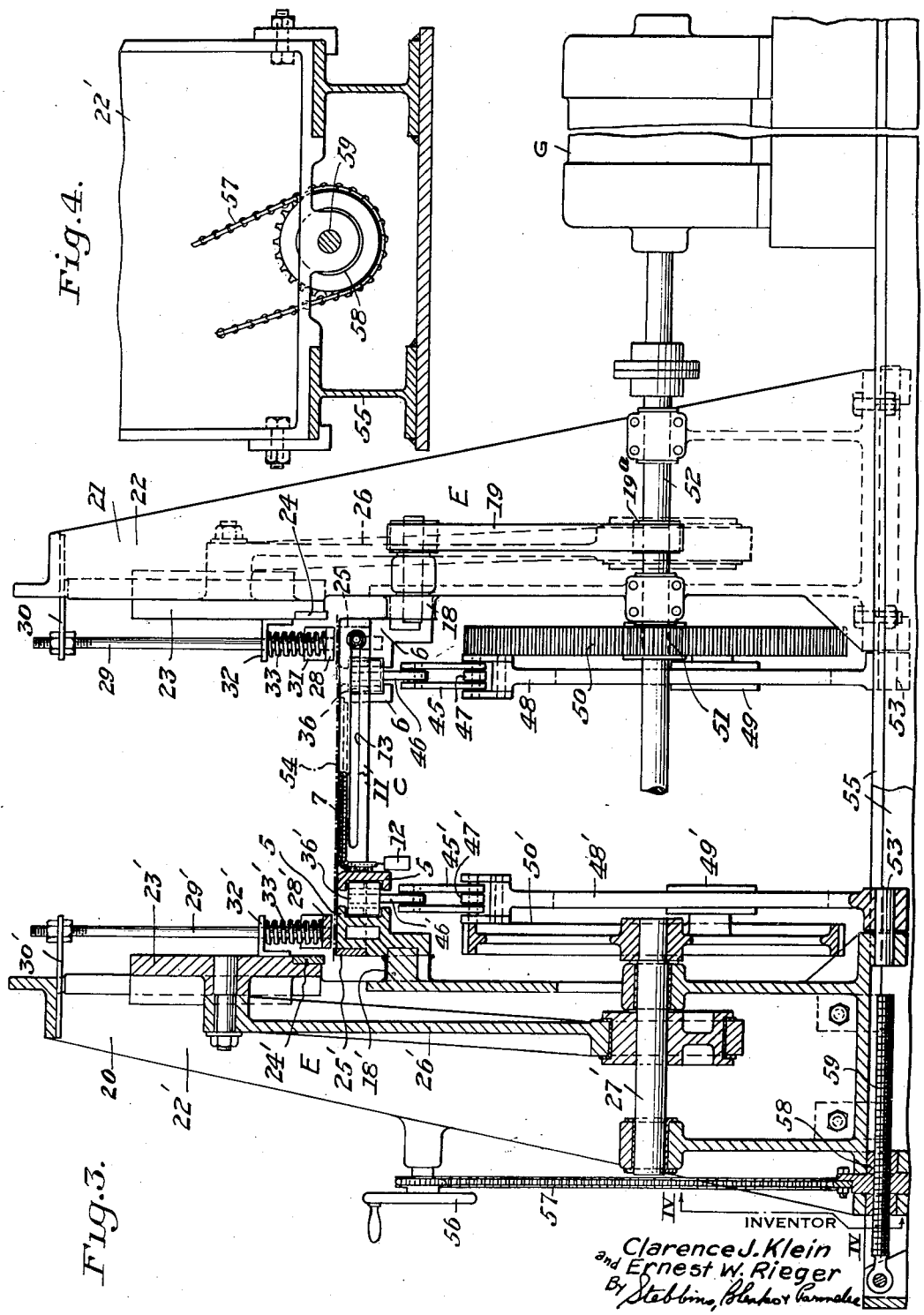

2,195,535

UNITED STATES PATENT OFFICE 2,195,535

APPARATUS FOR SHEARING

Clarence J. Klein, Marland Heights, W. Va., and Ernest W. Rieger, Bloomingdale, Ohio Application November 26, 1937, Serial No. 176,530

20 Claims. (Cl. 164—48)

The present invention relates broadly to apparatus for cutting material and more particularly for shearing sheet metal and the like. While the utility of the invention is not limited to the metal working art, it is particularly adapted thereto and especially to the resquaring of tin plate or sheets, and will be described in connection therewith. It is understood that the word "sheet" or "plate" as hereinafter used is a generic term used by way of definition and not by way of limitation and includes metallic or non-metallic shapes or pieces of various sizes and thicknesses.

The present methods of shearing sheets, and especially the flying shear method of cutting cold rolled plate for tinning, are not sufficiently accurate for certain further processing in the fabricators' plants. It is therefore necessary to resquare certain grades of plates, depending upon the buyer's requirements. In order to keep down the cost of resquaring such plate, it is necessary that the material be handled and fed to the shears and from the shears to the piler automatically and with the greatest possible speed. By apparatus such as we have invented, it is possible to square sheets either on two sides or on four sides at a rate of the order of 200 sheets per minute and to cut the sheets to the desired size within very close limits.

The apparatus which we have invented consists of means for feeding sheets from a pile onto a bed, means for moving the sheets along the bed to a shearing position under a pair of shears, means for operating the shears, and means for moving the sheets after they have been sheared to a piler. Our invention also contemplates, if desired, means for moving the sheet after it has been sheared on two sides to a bed, where it is moved to another pair of shear, which shears and square the other two sides, and from thence the sheet, squared on all four sides, is delivered to piling mechanism.

The apparatus is capable of being adjusted to accommodate various sizes and widths of sheets and the various parts of the apparatus are synchronized and are driven by one source of motive power. Means are also provided in connection with our apparatus for removing the sheared portions of the sheets away from the shearing blades without any attention thereto on the part of the operator. The arrangement of the apparatus is such that one or more feeders may be employed for feeding sheets to the bed and thence to the shearing apparatus. Insofar as we know, no single apparatus has yet been developed for feeding the sheets as rapidly as the shear mechanism can trim them, and it is within the contemplation of our invention to use a plurality of feeding mechanisms associated with each shear mechanism. Alternatively, a single feeder may be used and the speed of the shear adjusted to the feeder speed.

It is necessary that a definite speed of feeding the sheets to and moving them from the shear be maintained with respect to the speed of operation of the shear, and it is one of the objects of the present invention to provide means operating at high speeds for accomplishing this purpose. Furthermore, the sheets are accurately positioned in the apparatus and accurately cut to the desired size.

The present invention also has for its object to overcome the objections inherent in shearing systems as heretofore proposed, to obviate the limitations incident thereto, and to provide an apparatus for shearing the sides of sheets by means of which the desired accuracy of shearing may be continuously obtained in a very rapid and economical manner and with a minimum of attention on the part of the operator.

In the accompanying drawings, there are shown for purposes of illustration only, certain preferred embodiments of our invention, the drawings being more or less diagrammatic. In the drawings:

Figure 1 is a plan view of one form of the invention;

Figure 2 is a view partly in section but largely in elevation along the line II—II of Figure 1;

Figure 2A is a view similar to Figure 2, showing the apparatus in a different phase of the operating cycle;

Figure 3 is a view partly in elevation and partly in section along the line III—III of Figure 1;

Figure 4 is a view partly in elevation and partly in section along the line IV—IV of Figure 3;

Figure 5 is a view in section along the line V—V of Figure 1;

Figures 6 and 7 are views in section and in elevation, respectively, showing detail parts of the apparatus;

Figure 8 is a plan view of another modification of the invention; and

Figure 9 is a view partly in elevation and partly in section along the line IX—IX of Figure 8.

In accordance with the invention, there is provided in the embodiment shown in Figure 1 two sheet feeders A and B arranged along each side of a feed bed or shear table C over which separate sheets to be sheared can be moved by a transfer mechanism D to shear mechanism E and thence to a sheet piler F. All the apparatus is driven in synchronism from one prime mover herein shown as an electric motor G.

The feeders A and B are of the type which is capable of receiving a pile of sheets 2 and of feeding the sheets, one by one, from the pile onto the table C. Feeders of this type, for example the "Dexter feeder," are well known in the art, and an extended description thereof is unnecessary. Each of the feeders A and B has associated with it a pair of concave and convex rollers 3 and 4, respectively, the convex roll 3 being uppermost so that thin sheets will be bent when passing therethrough and thereby retain their rigidity and will be prevented from drooping as they are being fed across the table C to the desired position thereon. The feeders A and B are located so that the rolls 3 and 4 are positioned close to and parallel with the edges of table C so that the sheets may be readily fed to their proper position on the table C (see Figure 5).

The table C extends from a point beyond the feeders A and B through and to a point beyond the shear mechanism E, adjacent to piler F. The table has two side members 5 and 6, the side member 5 being movable and the side member 6 being fixed. An adjustable and extensible portion 7 is arranged between the members 5 and 6. The portion 7 is made from a series of bars 8 running lengthwise of the table and fastened adjacent to their ends to a link chain 9. The ends of the bars 8 are of reduced thickness (Figure 6) and are received in slots 10, formed in each of the end plates 11, which plates extend between the side members 5 and 6 and are fastened thereto. The portion of the slot 10 nearest the member 5 is curved to extend downwardly, and a weight 12 is attached to one end of the chain 9. The other end of chain 9 is attached to side member 6. The tops of bars 8 and the tops of side members 5 and 6 lie in a common horizontal plane. The end of the plate 11 which is attached to the side member 6 has a longitudinal slot 13 therein so that the side members may be moved relative to one another to adjust the width of the shear table C. In Figure 5 the table is shown as fully extended. Adjustable side guards 14 and 15 are secured to the outside of side members 5 and 6, respectively, and the setting thereof with respect to the side members can be varied by the insertion or removal of shims therebetween as determined by operating conditions. The side guards are flared outwardly at the top and extend upwardly to a position slightly below the pass line of the feed rolls 3 and 4.

The side members 5 and 6 are identical in construction and a description of one, namely, 6, will suffice. For clearness similar numerals with a prime affixed thereto will be applied to member 5. The side member 6 has a guide channel 16 running lengthwise for substantially the full length of the member and an outwardly extending side bracket or shelf 17 for supporting a belt conveyor 18 for carrying away the sheared edges from the shear mechanism to a desired discharge point. The conveyor 18 is driven by a belt 19 which, in turn, is driven by a pulley 19a on shaft 52.

The shear mechanism E consists of two guillotine type shears 20 and 21, one of which 20 is secured to the movable side member 5, and the other 21 to the fixed side member 6. As these shears are identical in construction, except as to the manner in which they are secured to the bed plate 55, shear 21 only will be described and similar numerals with a prime affixed thereto will be applied to shear 20. The shear 21 is of the well known reciprocating or guillotine type and consists of a frame 22 in which a head 23 is reciprocally mounted and to the lower edge of which a cutting blade or knife 24 is attached. This blade cooperates with the blade 25 secured to the outside of the side member 6. The head 23 is reciprocated by the pitman 26 which is driven by a shaft 27 rotated by a gear wheel 50 which, in turn, is driven by the pinion 51 on the shaft 52, which shaft is rotated by the motor G. A gag or sheet brake 28 is adjustably secured to the upper part of the shear frame 22 by supporting rods 29 and spring connections 30. The gag is positioned immediately above the side member 6 and adjacent to the shear blade 25 and cooperates with the side member to position the sheet and to hold it in position during the shearing operation. The gag consists of a runner-like portion arranged just above and along the side member 6. One end 31 of the gag facing the incoming sheet is flared upwardly to insure that the sheet will pass beneath the gag. The gag may be formed from metal, and if desired, may have the bottom surface formed from a material like brake lining having a desirable coefficient of friction for retarding the sheet.

Secured to the shear head 23 is a projecting member or shelf 32 in the form of an angle bar through which the rods 29 pass. Between the gag 28 and shelf 32, helical springs 33 are interposed. The upper ends of rods 29 are threaded through the spring connections 30 so that the gag can be adjusted vertically. It is one of the features of our invention that one end 34 of the gag, the end adjacent the piler F, may be so positioned that it can act as a brake to slow down and position the sheet to be sheared, as will be described later. It will be apparent from the construction and mode of support of the gag that it will be moved downwardly when the head 23 is moved downwardly and that pressure will be applied gradually to the gag through the springs 33. When the head moves upwardly, the spring members 30 will return the gag to its upper position.

The sheets are moved from the position in which they are placed on the table from the feeder A or B to a position under the shears by the transfer mechanism D which we will now describe. Movably disposed within the channel 16 of side member 6 is a sliding member 36 which has roller-bearing connections with the sides of the channel 16. The member 36 has adjacent its ends two depending portions or lugs 37 and 38 and midway of its end a depending portion or lug 39. To the depending portion 37 a bell crank lever 40 is pivoted. One end of the bell crank is pivotally secured to a vertically movable dog 41, which extends upwardly through an aperture in the member 36. The other end of the bell crank is pivotally secured to one end of a horizontally extending member or link 42, which member extends through the depending portion 39 and has collars 43 and 44 on either side of the depending portion 39. The other end of the member 42 is connected to one end of a second bell crank lever 45, which lever is pivotally secured to the lug 38. The other end of the bell crank lever 45 is pivotally secured to a vertically movable dog 46 which extends upwardly through an aperture in the member 36. The member 42 is pivotally connected by means of a link or connecting rod 47 to the upper end of a slotted link 48 of a swinging block linkage. This linkage consists of the slotted link 48 which is swung back and forth by a sliding block 49 moving in the slot of the link 48. The block 49 is attached to the wheel 50, which, as already stated, is driven by the pinion 51 on shaft 52. The lower end of the slotted link 48 is pivotally secured at 53 to the base of the shear frame below the lower portion of the gear wheel 50.

In Figure 2, we have shown the transfer mechanism D at what may be called the beginning of an operating cycle. This view shows the position of the shear blades 24 just after a shearing cut has been made and the blades are on the way up. The gag 28 has just released the sheet and the dogs 41 and 46 are just about to rise and move forward to push the sheared sheet into the piler and to deliver an unsheared sheet into the shearer. The sliding member 36 is at the extreme left-hand position with respect to the shear table C and the dogs 41 and 46 are in a retracted position such that the tops thereof are flush with or below the top surface of the shear table C. If the gear wheel 50 is rotated clockwise as shown, the sliding block 49 will cause the slotted link 48 to swing to the right or clockwise. During the travel of the block 49 through the arc represented by the angle α, the travel of the link 48 will cause the link 42 to move to the right and rotate the bell crank levers 40 and 45 and raise the dogs 41 and 46 upwardly to the position shown in dotted lines in Figure 2. The various parts of the apparatus are so adjusted that there is no forward movement of the sliding member 36 until the collar 43 engages the depending portion or lug 39 by which time the dogs 41 and 46 have been raised vertically to the desired extent. Further movement of the member 42 by the link 47 causes the sliding member 36 to move to the right so that the dog 41 will contact the sheet 54 which has just been fed onto the shear table C and will move the sheet to the position shown in Figure 2A, where it is in position to be cut by the shear mechanism E. While the sliding member 36 has been moving to the right, the sheet 54, which was previously trimmed by the shear mechanism E, will be moved to the right by dog 46 and into the piler mechanism F. Inasmuch as the sheet piler F may be of a type well known in the art and whose method of operation is well known, it is felt that no further description thereof is necessary.

Figure 2A shows a sheet 54a going into the piler with the followed unsheared sheet 54 just delivered to the shear. The gag is just clamping down and the top shear blade is going down. The dogs are ready to drop and move back to the position shown in Figure 2. The feeder is putting the next sheet 54b onto the left-hand end of the shear table C.

Continued rotation of gear wheel 50 from the position shown in Figure 2A through the arc β will cause the dogs 41 and 46 to be lowered to the position where the tops thereof will be flush with or below the surface of the table C at which time the collar 44 will contact the depending lug 39 and further rotation of gear wheel 50 will cause the transfer mechanism D to return to the position shown in Figure 2 at the beginning of the operating cycle. In the meantime, another sheet has been fed onto table C.

Associated with the side member 5 and the movable shear 20 is a portion of the transfer mechanism D, which is similar in construction to that which we have already described. The same numerals with a prime affixed have been used to designate like parts. The dogs 41 and 41' are disposed so that a line joining their centers is at right angles to the longitudinal axis of the shear table C. This arrangement insures that the sheets will be accurately presented to the shearing mechanism. Likewise, the arrangement of the dogs 46 and 46' is such that the sheets after they have been sheared are accurately presented to the piler F.

The apparatus is designed to travel at a high rate of speed of the order necessary to handle in the neighborhood of 200 sheets per minute and at such high rates of speed, it is evident that the speed of movement of the sheets along the table to the shear mechanism will be considerable. In order that the speed of travel of the sheet may be checked before the sheet is in the shearing position, we provide that the right-hand side of the gag 28 (as viewed in Figure 2) is slightly lower than the left-hand side, as hereinabove described, so that the gag will exert a braking action on the forward moving sheet. The descent of shear head 23 and the positioning of gag 28 is so determined that the sheet will be stopped and held in position by the gag just previous to the descent of the shears. This will insure that the sheets will always stop in the exact position desired.

We prefer to arrange the swinging block linkage in out-of-phase relation with the pitman 26 which reciprocates the shear head 23. Thus the shear head will be traveling at its lowest speed when the sheet transfer mechanism is traveling at or close to its greatest speed. By this arrangement, the gag 28 is moving slowly at the time the sheet is moving rapidly so that a closer adjustment of the gag relative to the side member 6 may be maintained.

The apparatus may be adjusted to handle and shear sheets of different widths. To that end, we have made one side of the apparatus (the left side as viewed in Figure 3) adjustable with reference to the other side. The shear frame 22 is fixedly secured to a bed plate 55 and shear frame 22' is secured to the bed plate 55 in such manner that it may be readily moved to and away from the frame 22. Mounted on frame 22' is a hand wheel 56 which is connected by means of a roller chain 57 to the sprocket of a nut 58 attached to the lower part of the frame 22'. The nut 58 is mounted on the threaded rod 59, which is mounted against turning on base plate 55. It is apparent that by rotation of the nut 58, the movable shear 20 can be adjusted relative to the fixed shear 21. The pinion 51' which drives the gear 50' is splined to the shaft 52 so that the pinion 51' and the gear wheel 50' remain in fixed position relative to one another for all working positions of the movable shear 20.

The embodiment of our invention which is illustrated in Figures 8 and 9 is designed to shear the four sides of a sheet. The apparatus consists of a feeder 60, similar to the feeder which we have already described, by means of which the sheets are fed, one by one, onto the shear table 61 and along that table by transfer mechanism to the fixed shears 62 and movable shears 63. After two sides of a sheet have been sheared, it is moved by the action of two dogs 64 and 65 of the transfer mechanism onto a conveyor mechanism 66, which conveys the sheet to shear table 67, where suitable transfer mechanism moves the sheet to fixed shear 68 and movable shear 69, where the remaining sides of the sheet are sheared. From the last mentioned shears, the sheet is moved to the piler 70. Inasmuch as the feeder 60, and tables 61 and 67, the transfer mechanism associated with each table, the shears 62, 63 and 68, 69 are similar in construction to mechanism heretofore described, it is considered unnecessary to further describe them. Suffice it to say, that all the mechanisms in both embodiments of my invention are driven by one suitable prime mover through suitable gearing as shown in Fig. 8.

The conveyor 66 which moves the sheets from the table 61 to the table 67 consists of two spaced apart endless belts 71 and 72. The arrangement of both belts is identical so that only one need be described, and like numerals with a prime affixed thereto are applied to the other belt. The belt 72, which is preferably a V-belt, passes around two pulleys 73 and 74. The pulley 74 is located adjacent to and supported by the exit end of table 61 and is driven at a proper feeding speed by suitable gearing from the shaft 75; while the pulley 73 is located adjacent to and supported by one side of the shear table 67 in such position that the sheets may be readily and properly fed onto the table 67. A roller 76 made of fibre is positioned over the top flight of the belt 72 and adjacent the pulley 73 and is normally in contact with the upper flight of the belt 72. The length of flight of the conveyor belt 72 is such that when a sheet is propelled forward by the dogs 64 and 65, the forward end of the sheet will pass between the wheel 76 and the top flight of the belt 72. The belt 72 is driven at a speed which is synchronized so as to place the sheet on table 67 at the proper time with respect to the sheet-transfer mechanism of table 67. It will be observed that belt 72 and its associated portions and wheel 73 are movable laterally with respect to belt 71, so as to accommodate various widths of sheets. It is also within the contemplation of our invention to provide that the apparatus represented by table 67, transfer mechanism, shears 68, 69 and piler 70 be so arranged that the apparatus, as a whole, may be adjusted in position with respect to the exit end of table 61, so that sheets of various lengths may be handled. To that end the conveyor mechanism 66 would be changed in length as required.

It is, of course, understood that in the embodiment of our invention shown in Figures 1 through 7 and in the embodiment shown in Figures 8 and 9, the feeding mechanism can be arranged at one or both sides of the shear table or on the end, as shown in Figure 8; or on the end and on one or both sides of the shear table, depending upon the desired arrangement. In any arrangement, the feeding of sheets will be synchronized with the action of the transfer mechanism and the action of the shear mechanism and piler.

From the foregoing it will be apparent that we have provided shearing apparatus which is economical to construct and operate, is automatic in operation and can be run at high speeds. The invention possesses the advantage of providing means for driving shearing mechanism at high speed and in definite speed relation to mechanism for supplying sheets to and moving them away from the shears after the sheets have been trimmed accurately to the desired size. The apparatus may be readily and simply adjusted to meet various operating requirements and also provides means for accurately positioning the sheets in the shearing position.

While we have herein illustrated and described certain preferred embodiments of our invention, it will be apparent that changes in the construction and operation of the parts may be made without departing from the spirit of the invention or the scope of the claims.

We claim:

1. In apparatus of the class described, a shear table, a pair of shears arranged opposite one another on opposite sides of the table, means for feeding sheets one by one from a pile onto said table, means interposed between said feeding means and the table for bending the sheets transversely of their path of travel whereby the sheets may be fed onto the table without drooping, reciprocating means for moving a sheet along said table to a shearing position under said shears and means for progressively retarding the longitudinal movement of a sheet as it approaches the shears whereby overfeeding of the sheet is prevented, said retarding means also serving to clamp the sheet in cutting position during the shearing stroke.

2. In apparatus of the class described, a shear table, a pair of shears arranged opposite one another on opposite sides of the table, means for feeding sheets one by one from a pile onto said table, means interposed between said feeding means and the table whereby the sheets may be fed onto the table without drooping, said last mentioned means comprising cooperating concave and convex rollers between which the sheet is passed, and reciprocating means for moving a sheet along said table to a shearing position under said shears and means for progressively retarding the longitudinal movement of a sheet as it approaches the shears whereby overfeeding of the sheet is prevented, said retarding means also serving to clamp the sheet in cutting position during the shearing stroke.

3. In apparatus of the class described, a shearing table, said table comprising spaced apart parallel side members, one of which is fixed and the other of which is movable relative thereto, a shear secured to each side member and supporting surfaces extending between said members, the top of the supporting surfaces and the top of the side members lying in one plane, said supporting surfaces between the side members being extensible, means adjacent one end of the table for feeding sheets onto the table, means for moving the sheets to a position such that the shears may operate thereon, means adjacent the other end of the table for receiving and piling the sheared sheets, and means for moving the sheared sheets from the shears and into the piler.

4. In apparatus of the class described, a shearing table, said table comprising spaced apart parallel side members, one of which is fixed and the other of which is movable relative thereto, a shear secured to each side member and supporting surfaces extending between said members, the top of the supporting surfaces and the top of the side members lying in one plane, said supporting surfaces between the side members being extensible, means adjacent one end of the table for feeding sheets onto the table, means for moving the sheets to a position such that the shears may operate thereon, means adjacent the other end of the table for receiving and piling the sheared sheets, and means for moving the sheared sheets from the shears and into the piler, said sheet-moving means being actuated by a swinging block linkage.

5. In apparatus of the class described, a shearing table, said table comprising spaced apart parallel side members, one of which is fixed and the other of which is movable relative thereto, means for moving said movable side member, a shear secured to each side member and supporting surfaces extending between said members, the top of the supporting surfaces and the top of the side members lying in one plane, said supporting surfaces between the side members being extensible, means adjacent one end of the table for feeding sheets onto the table, means for moving the sheets to a position such that the shears may operate thereon, means adjacent the other end of the table for receiving and piling the sheared sheets, and means for moving the sheared sheets from the shears and into the piler.

6. In apparatus of the class described, a shearing table, said table comprising spaced apart parallel side members, one of which is fixed and the other of which is movable relative thereto, a shear secured to one side member, a shear secured to the other side member, each of said shears comprising a frame, a head reciprocably mounted in the frame, a cutting blade on each head, a cooperating blade secured to each side member, a gag for retarding the sheet and for holding the sheet in shearing position, a spring support for securing the gag to the frame, means on said head for moving said gag downwardly toward the side member, and means for adjusting the positions of the gag relative to the side member.

7. Sheet feeding and shearing mechanism, comprising spaced apart shear units for operating on opposite edges of a sheet, means for adjusting one unit toward and away from the other, an extensible table between the shear units, and means for extending and contracting said table to vary its width simultaneously with the relative adjustment of the shear units.

8. Sheet feeding and shearing mechanism, comprising spaced apart shear units for operating on opposite edges of a sheet, means for adjusting one unit toward and away from the other, an extensible table between the shear units, means for extending and contracting said table to vary its width simultaneously with the relative adjustment of the shear units, and feeding mechanism movable along each edge of said table, the feeding means along one edge being adjustable along with the adjustment in the width of the table and the shears.

9. Sheet feeding and shearing apparatus comprising opposed edge shears for trimming opposite edges of a sheet, means for thrusting a sheet into position between the shears, and means for progressively retarding the free movement of the sheet as it approaches the shearing position between the shears whereby the sheet is accurately positioned and overtravel is prevented.

10. Sheet feeding and shearing apparatus comprising opposed edge shears for trimming opposite edges of a sheet, means for thrusting a sheet into position between the shears, and means connected with and operated by the shears for progressively retarding the free movement of the sheet as it approaches the shearing position between the shears whereby the sheet is accurately positioned and overtravel is prevented.

11. Sheet feeding and shearing apparatus comprising opposed edge shears for trimming opposite edges of a sheet, means for thrusting a sheet into position between the shears, and means for frictionally retarding the free movement of the sheet as it approaches the shearing position between the shears whereby the sheet is accurately positioned and overtravel is prevented, said means applying gradually increasing friction as the sheet is moved into shearing position, said feeding means moving the sheet with decreasing speed during the same portion of travel of the sheet.

12. In apparatus of the class described, a shear table, shearing means arranged parallel to the longitudinal axis of the table, means for feeding sheets one by one onto the table, means for moving the sheets along the table into a position to be operated on by the shearing means, means for moving said sheets away from said shears, a second shear table, means for feeding said sheets one by one to the second shear table, shearing means arranged parallel to the longitudinal axis of the second table, means for moving the sheets along the table into a position to be operated on by the last mentioned shearing means, a piler, and means for moving said sheared sheets from the shears to the piler.

13. In apparatus of the class described, a shear table, shearing means arranged parallel to the longitudinal axis of the table, means for feeding sheets one by one onto the table, means for moving the sheets along the table into a position to be operated on by the shearing means, means for moving said sheets away from said shears, a second shear table, means for feeding said sheets one by one to the second shear table, shearing means arranged parallel to the longitudinal axis of the second table, means for moving the sheets along the table into a position to be operated on by the last mentioned shearing means, a piler, means for moving said sheared sheets from the shears to the piler, and common driving means for operating all of said moving parts in synchronism.

14. In apparatus of the class described, a shear table, shearing means arranged parallel to the longitudinal axis of the table, means for feeding sheets one by one onto the table, means for moving the sheets along the table into a position to be operated on by the shearing means, means for moving said sheets away from said shears, a second shear table angularly disposed with respect to the first table, means for feeding said sheets one by one to the second shear table, shearing means arranged parallel to the longitudinal axis of the second table, means for moving the sheets along the table into a position to be operated on by the last mentioned shearing means, a piler, and means for moving said sheared sheets from the shears to the piler.

15. In apparatus of the class described, a shear table, shearing means associated with said table, means for feeding a sheet onto said table, means for moving a sheet along said table to a shearing position beneath said shearing means, and means effective in normal position progressively to retard said sheet as it moves to shearing position, said last-mentioned means being movable by said shearing means into engagement with a sheet in shearing position to hold the sheet in position while being sheared.

16. In apparatus of the class described, a shear table, shearing means associated with said table, means for feeding a sheet onto said table, means for moving a sheet along said table to a shearing position beneath said shearing means, and means for progressively retarding said sheet as it approaches shearing position.

17. In apparatus of the class described, a shear table, a pair of shears arranged opposite one another on opposite sides of the table, means for feeding sheets one by one from a pile onto said table, means for moving a sheet along said table to a shearing position under said shears, and then away from the shearing means, said last-mentioned means comprising slides movable along said table, vertically movable dogs associated with the member, and means for reciprocating said slides, said last-mentioned means including means moving the dogs vertically before each movement of the slides along the table.

18. In apparatus of the class described, an extensible shear table, means for feeding a sheet onto said table, means for shearing both sides of the sheet arranged parallel to and adjacent the sides of the table, means for moving a sheet along the table to a shearing position beneath said shearing means, means for progressively retarding the longitudinal movement of the sheet as it approaches the shears and for clamping the sheet after it has reached the shearing position and during the shearing operation, means for moving the sheet away from said shearing means while it moves the next succeeding sheet under the shearing means, a conveyor extending along and substantially parallel to said shearing means below said table for carrying away the portions of the sheet which have been sheared from the sides thereof.

19. In apparatus of the class described, a shearing table, said table comprising spaced apart parallel side members, one of which is fixed and the other of which is movable relative thereto, a shear secured to each side member and supporting surfaces extending between said members, the top of the supporting surfaces and the top of the side members lying in one plane, said supporting surfaces between the side members being extensible, means adjacent one end of the table for feeding sheets onto the table, means for moving the sheets to a position such that the shears may operate thereon, and means connected with and operated by the shears for progressively retarding the free longitudinal movement of the sheet as it approaches the shearing position and for clamping the sheet after it has reached the shearing position and during the shearing operation.

20. Sheet feeding and shearing apparatus comprising opposed edge shears for trimming opposite edges of a sheet, means for thrusting a sheet into position between the shears, means for progressively retarding the free longitudinal movement of the sheet as it approaches the shearing position between the shears whereby the sheet is accurately positioned and over-travel is prevented, and a conveyor extending along said shears below said shears for carrying away the portions of the sheet which have been sheared from the sides thereof.

CLARENCE J. KLEIN.
ERNEST W. RIEGER.